May 8, 1951 A. E. LE VAN 2,552,332
COMPASS
Filed Jan. 30, 1945

INVENTOR
Ambrose E. LeVan
BY
Bruno C. Lechler
ATTORNEY

Patented May 8, 1951

2,552,332

UNITED STATES PATENT OFFICE 2,552,332

COMPASS

Ambrose E. Le Van, Sellersville, Pa., assignor to American Machine and Metals, Inc., New York, N. Y., a corporation of Delaware Application January 30, 1945, Serial No. 575,267

1 Claim. (Cl. 33—222)

This invention relates to a magnetic compass and more particularly to a compass of the light portable type which may be carried in the hand, and which may be otherwise readily transported.

It is an object of this invention to provide a compass which will afford the maximum reliability and rigidity while at the same time giving great sensitiveness and accuracy, with a high degree of damping.

It is a further object to provide a compass which will maintain its accuracy and reliability under extremely adverse conditions of use. For example, it is free from liability of corrosion even under prolonged exposure to a tropical marine atmosphere or when immersed in sea water, and it is free from the liability of growth of fungus upon its parts, and it will withstand an unusual degree of shock without impairing its sensitiveness.

It is a further object to provide an instrument of the character described which will give accurate readings even though it be placed at a substantial angle to the horizontal plane.

It is a further object to provide a compass which will have the highest degree of damping and yet, does not require submersion of the parts in liquid, and hence is free from all the troubles which are inherent in the immersion type of instrument, such as leakage, and poor visibility from discoloration of the liquid.

It is a further object to secure all the advantages of the air supported type of instrument including the freedom of the needle to maintain its position regardless of rapid changes of the direction of the support while yet maintaining a damping effect to the maximum degree.

It is a further object to provide an instrument of the character described which will maintain the maximum legibility and reliability, with a minimum of weight.

It is a further object to provide an instrument in which, in any latitude, the tilt of the moving parts, that is the declination due to the vertical magnetic field will be a minimum.

Other objects will in part be obvious and will in part appear hereinafter.

The invention accordingly comprises an article of manufacture possessing the features, properties and the relation of elements which will be exemplified in the article hereinafter described and the scope of the application of which will be indicated in the claim.

Figure 1:
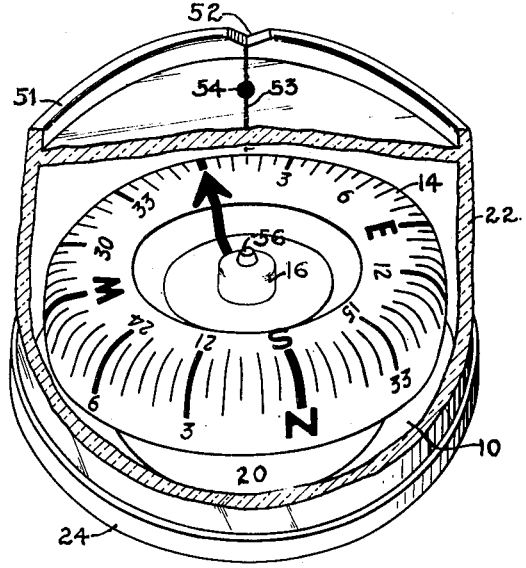
Figure 2:
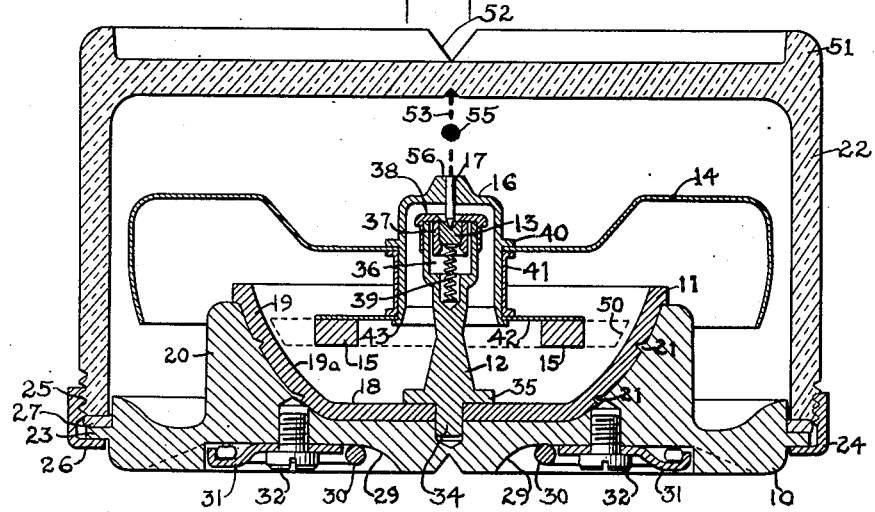

For a fuller understanding of the nature and objects of the invention, reference should be had to the following detailed description taken in connection with the accompanying drawing, in which:

Fig. 1 is a perspective plan of an instrument embodying this invention. Fig. 2 is a cross section through the center of the instrument.

The instrument consists primarily of a base 10, which may be of any suitable plastic, such for example as Bakelite, into which is molded a concentric damping cup 11. In the center of the cup is mounted a jewel post assembly 12 supporting a jewel 13. The movable part or rotor comprises a card or dial 14 and a pair of magnets 15 supported by a card bushing 16 in which is mounted the pivot 17 which in turn rests upon the jewel 13.

The damping cup 11 has a flat bottom wall 18 and a side wall 19. The interior surface 19a of the cup is a segment of a sphere with its center at the point of engagement of the jewel 13, and the pivot 17. To accommodate the damping cup, the base 10 is provided with an upstanding central annular boss 20 in which the periphery of the wall 19 is embedded and to which it is bonded. The cup is also interlocked with the boss by reason of circumferential recesses 21 in the spherical wall 19 into which the molded material of the base extends.

The entire instrument is closed with a cover member 22, of a transparent material, which is held against a circumferential flange 23 on the base, by a ring 24 which is threaded onto the cover member at 25. This ring has an inwardly extending flange 26 fitting against the underside of the flange 23, a suitable gasket member 27 being interposed between the flange 23 of the cover member.

The base member 10, has two recesses 29 in its underface in each of which there is contained an attaching ring or loop 30 held in place by a clip 31 which in turn is held in place by a screw 32. These parts may be made of beryllium, bronze or other suitable non-corrosive material. The loops 30 when extended outwardly serve as a means of attaching the compass to the wrist or to any other available support. For example, if the compass is to be used on a vehicle such as an airplane or the like in which there is a local magnetic field which requires neutralization, these rings may be used to attach the compass in fixed relation to a support which also carries the neutralizing magnets.

The jewel post assembly 12 has a downwardly extending stem 34 which forms a force fit with a central opening in the damping cup 11 and in the Bakelite base as shown, while a circumferential flange 35 surrounding the stem gives a firm bearing against the bottom of the cup. This stem at its upper end has a recess 36 within which there is slidably mounted a jewel support 37 in which the jewel 13 is centrally mounted, the jewel support and jewel being held in place by jewel cap member 38 fitting over the outside of the stem. A spring 39 within the recess bears upwardly against the bottom of the jewel which, in static condition, holds the jewel member against the cap member 38. This spring 39, however, is light enough, to yield on even slight shock, to cushion the shock and prevent damage to the surface of the jewel or to the pivot.

The bushing 16 has an outwardly extending flange 40 against the underface of which the card 14 rests and against which it is held in place by a spacer sleeve 41. The magnets 15 are carried by a bracket 42 which is held against the lower face of the sleeve 41 by a flange 43 on the shell 16. This flange may be conveniently formed by spinning the bottom of the bushing outwardly, after the parts have been assembled.

The construction here devised for damping the magnet is made practical by the extremely high magnetic retentive properties of some of the new aluminum containing magnetic alloys of which many are known, and of which the magnets are made. I have found a suitable alloy to be sold under the trade name "Alnico V" which it is believed is an alloy of aluminum and nickel which is rendered magnetic by certain heat treatments.

Two magnets 15 are used, in spaced parallel relation as shown, and they are attached to the lower face of the bracket 42, as for example, by being soldered thereto, care being taken to avoid destruction of the magnetic properties of the magnets in so doing.

The magnets are shown in Fig. 2 in section in full lines, but in dotted lines, I have also shown the shape of the magnets when the rotor has been moved 90 degrees. From this it will be seen that the magnets have their ends 50, closely adjacent to the inner surface 19a of the cup 11 and these ends 50 are ground to conform to the curvature of that cup and thus, regardless of whether the rotary part is tilted or not, the ends of the magnets remain as close to the surface of the cup as it is mechanically practicable to make them, in all positions of the rotor.

The cover 22 is made of a transparent thermoplastic material. This is equipped with a rim 51 having two diametrically opposite V slots 52 therein to facilitate sighting the heading; and in alignment therewith, there is provided upon the inner face of the cover, a fine V lubber-line 53 molded into the interior of the cover, filled with a durable white lacquer as a reference for the indicated heading.

Four identifying spots upon the cover in alignment with the lubber-line 53 indicate the location of the lubber-line for observation at night, two of these 54 are upon the face of the cover and two 55 are upon the side wall thereof. It is desirable to make all of the indicating marks upon the card and upon the cover of radium bearing material to facilitate reading at night.

I found it desirable, moreover, to cover the magnets 15 with a lacquering material which will prevent the growth of fungus upon the magnets which might otherwise impair the operation. For this purpose, I have found the lacquer sold under the trade name "Insul-X" quite desirable.

The damping cup 11 with preferably be made of throughly annealed copper in order to get the maximum damping and with this construction and the type of magnet employed, I can secure in commercial production, a very high degree of damping. The total elapsed time required for the compass to settle at any heading after being deflected at 30 degrees off the magnetic north is two to three seconds. This may be compared with the standard liquid filled compass which requires from fifteen to twenty-five seconds and with an air damped card or needle type compass at from twenty to forty seconds.

By arranging a pair of magnets spaced from each other and parallel and bringing each one close to the shell, we secure a damping effect at four points around the axis. This means that the compass can reach its position very rapidly, and yet with a highly damped motion because the resistance to movement is dependent solely upon the speed of movement.

When it is desirable to do so, it is possible to increase the damping still further by plating the interior of the cup with .002 inch film of silver and by reducing the air gap to the absolute minimum. In such case, it is possible to construct the instrument so that it will not pass zero more than once from any deflection up to 180 degrees. Such degree of damping, however, is ordinarily not required.

With the construction outlined, there is very little tilting of the card in response to the vertical component of the magnetic field, because the magnets and the major portion of the card which constitute a material portion of the weight of the rotor, are situated considerably below the point of suspension, that is the point where the pivot 17 engages the jewel 13.

When this instrument is not in use, it is preferably inverted upon its face, so that the top point 56 of the bushing 16 will rest upon the interior of the cover, and there will be no engagement between the pivot and the jewel. It will be observed, however, that the bushing is of such length that it will continue to enclose the top 33 of the jewel post assembly 12, so that on reversal of the instrument, the pivot will immediately fall into position on the jewel.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

A portable compass suitable for use on the wrist and which will float if dropped in the ocean having, in combination, a base, a saucer-like damping cup having a flat bottom and sides forming part of a sphere whose center is above the rim, a post rising in the center of the damping cup and having a cylindrical pocket surrounded by an inwardly-turned rim at its top, a jewel bearing sliding in said pocket, a spring normally pushing the bearing upward against said inwardly-turned rim, an indentation in the jewel bearing which lies at the center of said spherical surface when the bearing lies against the inturned rim, a transparent cylindrical cover attached to said base and enclosing said post, a cylindrical sleeve having a closed upper end which carries a pivot on which the sleeve is suspended from said jewel when the compass is in use but which when the compass is tilted on its side rests against the sides of the post and when the compass is inverted, rests against the end of said transparent cylinder, a pair of magnetic rods suspended from said cylinder parallel to each other and to the base of the damping cup with the ends of the magnetic rods ground to a spherical surface slightly smaller than the inner surface of the sides of the damping cup so that when the compass in its observing position is jolted the inertia of the cylindrical sleeve and parts attached thereto will cause the jewel to be pushed down against its spring until the magnets seat on the damping cup walls.

AMBROSE E. LE VAN.

REFERENCES CITED

The following references are of record in the file of this patent:

UNITED STATES PATENTS

| Number | Name | Date |
| --- | --- | --- |
| 1,424,804 | Day | Aug. 8, 1922 |
| 1,474,394 | Warburg | Nov. 20, 1923 |
| 1,679,764 | Colvin | Aug. 7, 1928 |
| 2,018,536 | Salzgeber | Oct. 22, 1935 |
| 2,087,086 | De Beeson | July 13, 1937 |
| 2,116,103 | De Beeson | May 3, 1938 |
| 2,127,878 | Martin | Aug. 23, 1938 |
| 2,316,873 | Kollsman | Apr. 20, 1943 |
| 2,402,638 | Krasnow et al. | June 25, 1946 |
| 2,446,568 | Wolfe | Aug. 10, 1948 |

FOREIGN PATENTS

| Number | Country | Date |
| --- | --- | --- |
| 137,984 | Austria | June 11, 1934 |
| 384,308 | France | Jan. 31, 1908 |
| 813,078 | France | Feb. 15, 1937 |